United States Patent
Showalter et al.

[11] Patent Number: 5,855,448
[45] Date of Patent: Jan. 5, 1999

[54] BALL JOINT ASSEMBLY

[75] Inventors: Jeff Showalter, Wayne; Luigi Mastrofrancesco, Livonia; Syed Hasan Sarmast, Northville, all of Mich.

[73] Assignee: Ford Global Technologies, Inc., Dearborn, Mich.

[21] Appl. No.: 954,153

[22] Filed: Oct. 20, 1997

[51] Int. Cl.[6] .................................................... F16C 11/06
[52] U.S. Cl. ........................ 403/134; 403/122; 403/135; 277/630
[58] Field of Search .................................... 403/122, 128, 403/130, 131, 132, 134, 135, 140, 76, 77, 133; 277/630, 637; 29/898.043, 898.044, 898.048, 898.11

[56] References Cited

U.S. PATENT DOCUMENTS

| | | | |
|---|---|---|---|
| 2,569,823 | 10/1951 | Moskovitz . | |
| 2,977,131 | 3/1961 | Moskovitz et al. . | |
| 3,233,929 | 2/1966 | Herbenar | 403/140 |
| 3,389,927 | 6/1968 | Herbenar | 403/140 |
| 3,695,650 | 10/1972 | Stuck . | |
| 3,695,651 | 10/1972 | Stuck . | |
| 4,017,197 | 4/1977 | Farrant | 403/132 X |
| 4,076,344 | 2/1978 | Gaines et al. | 403/140 X |
| 4,790,682 | 12/1988 | Henkel | 403/140 |
| 4,875,794 | 10/1989 | Kern, Jr. | 403/132 |
| 4,995,754 | 2/1991 | Ishii | 403/132 |
| 5,011,321 | 4/1991 | Kidokoro . | |
| 5,318,373 | 6/1994 | Buhl et al. | 403/134 |
| 5,368,408 | 11/1994 | Shimizu et al. | 403/140 |
| 5,498,092 | 3/1996 | Fellows | 403/122 X |
| 5,551,791 | 9/1996 | Schneider | 403/122 X |
| 5,615,967 | 4/1997 | Hellon . | |
| 5,704,726 | 1/1998 | Nemoto | 403/132 X |

Primary Examiner—Harry C. Kim
Attorney, Agent, or Firm—Raymond L. Coppiellie

[57] ABSTRACT

A ball joint assembly is disclosed which comprises a generally cylindrical housing having a recess at one end thereof with a circumferential lip, a ball element disposed in the housing, and a joint pin connected to the ball element and extending from the housing. The assembly further includes a polymeric bearing disposed over the ball element in the housing and a cover plate for sealing the ball element and bearing in the housing and preventing contaminants from entering the housing.

8 Claims, 2 Drawing Sheets

BALL JOINT ASSEMBLY

BACKGROUND OF THE INVENTION

1. Field of the Invention

The present invention relates to ball joint assemblies. More particularly, the present invention relates to an economical ball joint assembly which prevents contaminants from entering the assembly.

2. Disclosure Information

In known ball joint assemblies, cover plates are typically crimped over the assembly to prevent axial movement of the joint in a housing and to prevent water or other contaminants from entering the joint and degrading its function. Typically, the cover plates are flat and are secured by crimping a lip of the joint housing over the plate. The lip extends above the plate after crimping, resulting in an area between the lip and the cover plate which collects contaminants while the joint is in use. Although a seal is provided by the cap, the contaminants still flow into the assembly, typically by capillary flow between the cover plate and the lip of the housing.

Many suggestions for preventing contamination have been proposed. For example, it is known to fill the collecting area with adhesives or liquid sealers. However, these sealers are messy, difficult to control and often wear out or do not completely prevent contaminants from flowing past them. Another proposal is taught in U.S. Pat. No. 3,695,651. The '651 patent teaches hermetically sealing a ball joint assembly by friction welding a dome-shaped cap over the end of the ball and socket assembly. The '651 patent uses a metal disk which is friction welded to a polymeric material. Although this system probably achieves the goal of completely preventing contamination of the assembly, it is expensive and difficult to implement in a production environment because of the added equipment and labor to friction weld.

Therefore, it would be desirable to provide an economical, simple solution for preventing contamination of a ball joint assembly.

SUMMARY OF THE INVENTION

The present invention solves the problems associated with the prior art by providing a ball joint assembly, comprising a generally cylindrical housing having a recess at one end thereof with a circumferential lip disposed thereat, a ball element disposed in the housing, and a joint pin connected to the ball element and extending from the housing. The assembly further includes a polymeric bearing including a lubricant disposed over the ball element in the housing and a cover plate for sealing the ball element and bearing in the housing and preventing contaminants from entering the housing. The cover plate is disposed over the bearing in the housing, and includes a generally planar disk and a sealing cap disposed over the disk. The disk contacts the bearing and prevents axial movement of the ball element in the housing. The sealing cap includes a generally circular member having a planar portion and a plastically deformable peripheral wall projecting generally perpendicularly to the planar portion circumferentially around the circular member. The peripheral wall prevents passage of contaminants between the disk and the housing. The cover plate is secured over the bearing in the housing by rolling the housing circumferential lip over the planar portion and peripheral lip of the sealing cap.

It is an advantage that the present invention prevents contamination of the ball joint assembly in an economical manner which can simply be incorporated in many different ball joint configurations. These and other objects, features and advantages will become apparent from the drawings, detailed description and claims which follow.

DETAILED DESCRIPTION OF THE PREFERRED EMBODIMENTS

Figure 1:
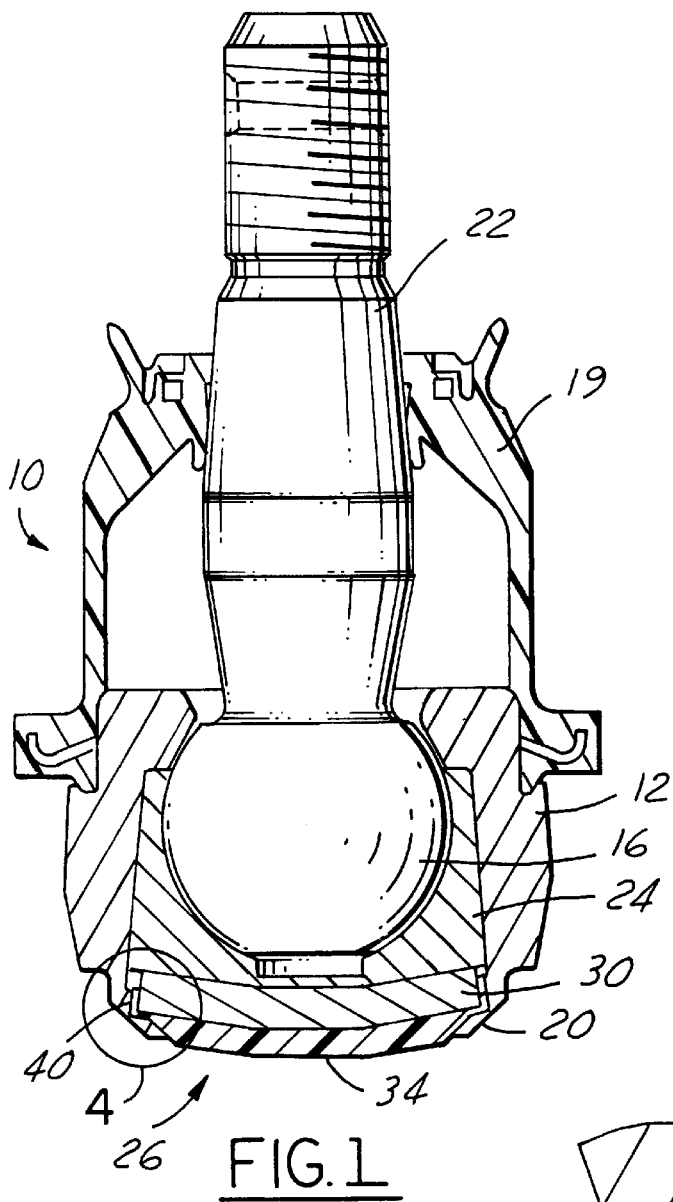
FIG. 1 is a cross-sectional view of a ball joint assembly structured in accord with the principles of the present invention.
Figure 2:
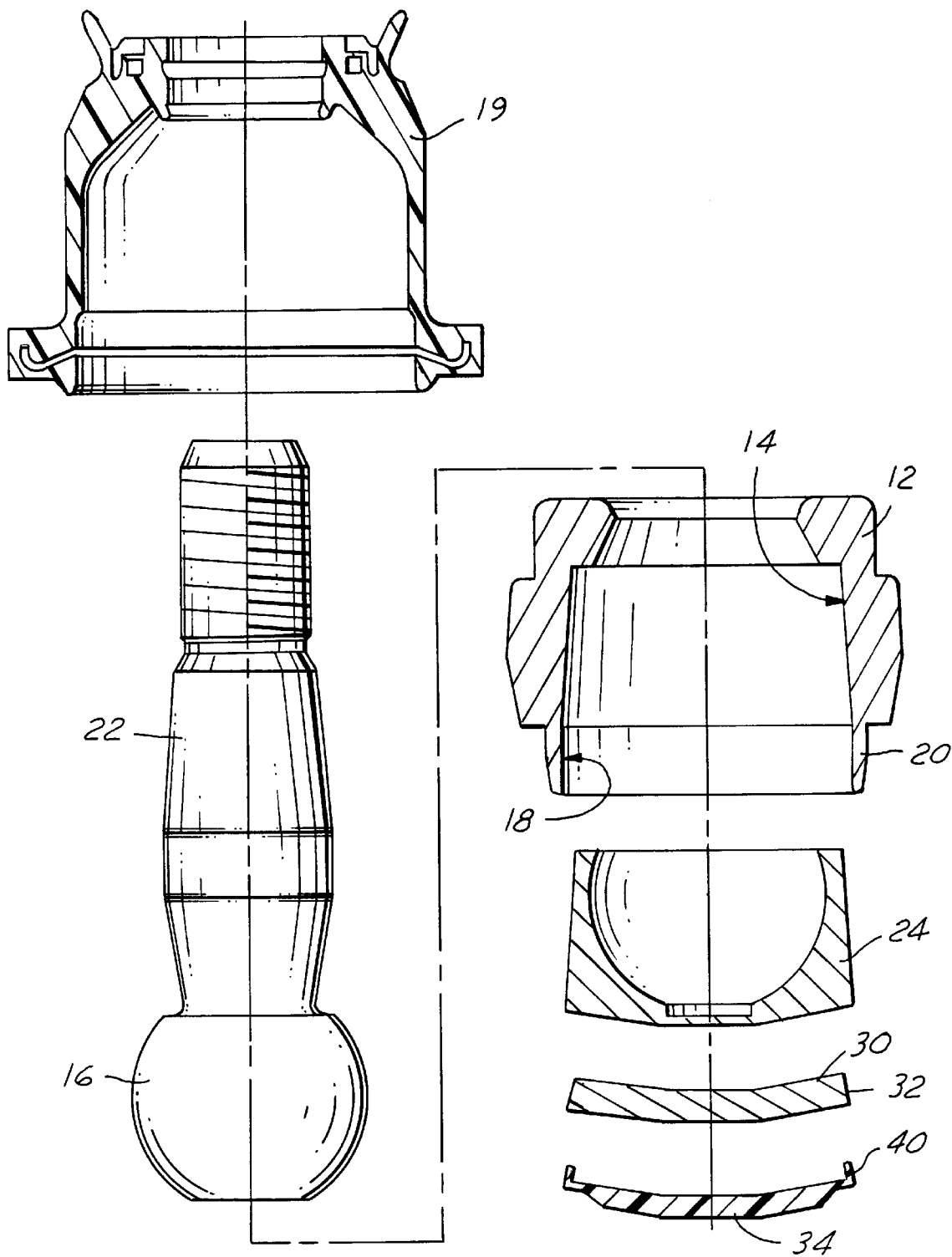
FIG. 2 is an exploded view of the ball joint assembly of FIG. 1.

As shown in FIGS. 1 and 2, the ball joint assembly 10 of the present invention includes a generally cylindrical housing 12 defining a cavity 14 for holding a spherical ball element 16 therein. The housing 12 further includes a recess 18 at one end with a circumferential lip 20 disposed around the recess 18. A joint pin 22 is connected to the ball element 16 and extends outwardly from the housing 12. A flexible boot 19 for holding a lubricant and/or preventing contaminants into the assembly 10 is secured to the joint pin 18 and housing 12 in known manner. Ball joint assemblies of this type are commonly used in the automotive industry, for example, in steering or wheel suspension linkages.

The ball element 16 is supported in the housing cavity 14 by a bearing element 24 and a cover plate 26. The bearing element 24 is a polymeric, cup-shaped member which fits over the spherical ball element 16. A lubricant, such as a PTFE filled silicone grease, can be placed between the bearing element 24 and the ball 16 to provide added lubricity. The cover plate 26 is secured to the housing 12 over the bearing 24 and ball 16. The plate 26 provides mobility to the joint assembly in all but axial directions as wall as prevents contamination of the joint during its use as will be described below.

Figure 3:
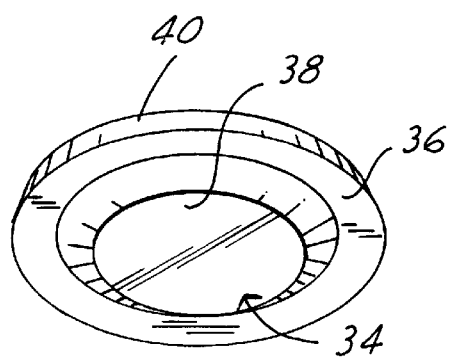
FIG. 3 is a perspective view of a sealing cap structured in accord with the present invention.
Figure 4:
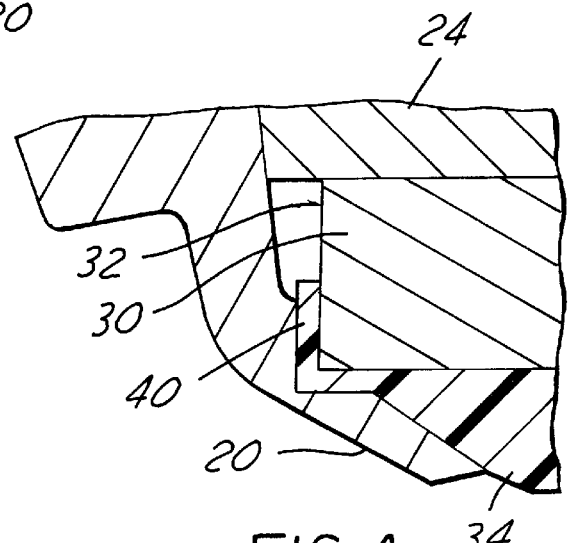
FIG. 4 is an exploded view of the area circled in FIG. 1.

The cover plate 26 includes a rigid, generally planar disk 30 which contacts the bearing 24. The disk 30 includes a peripheral edge 32 and is typically manufactured from a rigid material such as a steel alloy. A sealing cap 34 is press-fit over the disk 30 to complete the cover plate 26. As shown in FIG. 3, the sealing cap 34 is a plastically deformable, polymeric member having a generally circular configuration. The cap 34 includes a generally planar portion 36, a domed-shaped portion 38 and a plastically deformable peripheral wall 40 projecting generally perpendicularly to the planar portion 36. The dome-shaped portion 38 of the cap 34 prevents contaminants from collecting over the ball element 16 while the peripheral wall 40 prevents passage of contaminants between the disk 30 and the housing 12 as shown in FIG. 4. The deformable wall 40 acts as a gasket between the metal disk 30 and the metal housing 12, thus preventing passage of contaminants thereby.

The cover plate 26 is secured over the bearing 24 in the housing 12 by rolling the housing circumferential lip 20 over the planar portion 36 and peripheral wall 40 of the sealing cap 34. The rolling process may be a swaging operation or any of other known operations.

A method for preventing contamination of the ball joint assembly 10 is provided by the cover plate 24 of the present invention. As described above, the sealing cap 34 is press-fit onto the circular disk 30 such that the wall 40 extends at least partially over the peripheral edge 32 of the disk. Then, the sealing cap 34 and disk 30 are placed over the bearing 24 in the housing 12. The housing circumferential lip 20 is rolled over the seal cap 34 as described to plastically deform the sealing cap between the bearing and the housing.

Various other modifications and permutations of the present invention will, no doubt, occur to those skilled in the art. For example, the sealing cap can be fabricated from a variety of different polymeric materials, such as urethane. It is the following claims, including all equivalents, which define the scope of the present invention.

What is claimed is:

1. A ball joint assembly, comprising:

a generally cylindrical housing having a recess at one end thereof with a circumferential lip disposed thereat;

a ball element disposed in said housing;

a joint pin connected to said ball element and extending from said housing;

a polymeric bearing disposed over said ball element in said housing and including lubricant therein;

a cover plate for sealing said ball element and bearing in said housing and preventing contaminants from entering said housing, said cover plate being disposed over said bearing in said housing, said cover plate including a generally planar disk and a sealing cap disposed over said disk, said disk being adapted to contact said bearing and prevent axial movement of said ball element in said housing, said sealing cap including a generally circular member having a planar portion and a plastically deformable peripheral wall projecting generally perpendicularly to said planar portion circumferentially around said circular member, said peripheral wall being configured to prevent passage of contaminants between said disk and said housing; and wherein said cover plate is secured over said bearing in said housing by rolling said housing circumferential wall over said planar portion and peripheral lip of said sealing cap.

2. A ball joint assembly according to claim 1, wherein said sealing cap further includes a dome-shaped portion extending above said planar portion for directing contaminants away from said housing.

3. A ball joint assembly according to claim 1, wherein said sealing cap fits over said disk by an interference fit.

4. A ball joint assembly according to claim 1, wherein said sealing cap is manufactured from a synthetic, polymeric material.

5. A ball joint assembly according to claim 1, wherein said circumferential lip is rolled over said sealing cap in a swaging operation.

6. A method of preventing contaminants from entering a ball and socket assembly having a generally cylindrical housing having a recess at one end thereof with a circumferential lip disposed thereat, a ball element disposed in said housing and a polymeric bearing disposed over said ball element, said method comprising the steps of:

providing a generally circular disk of rigid material, the disk having a peripheral edge;

providing a sealing cap having a generally circular member having a planar portion and a plastically deformable peripheral wall projecting generally perpendicularly to the planar portion circumferentially around said circular member, securing the sealing cap over the disk in an interference fit such that the peripheral wall covers the peripheral edge of the disk;

placing the sealing cap and disk over the bearing in the housing;

rolling the housing circumferential lip over the planar portion and peripheral wall of the sealing cap to plastically deform the sealing cap between the bearing and the housing.

7. The method according to claim 6, further including the step of forming a dome-shaped portion in the sealing cap.

8. The method according to claim 6, further including the step of forming the sealing cap from a synthetic, polymeric material.

* * * * *

UNITED STATES PATENT AND TRADEMARK OFFICE
Certificate

Patent No. 5,855,448                                                     Patented: January 5, 1999

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Jeff Showalter, Wayne, MI; Luigi Mastrofrancesco, Livonia, MI; Syed Hasan Sarmast, Northville, MI; Christopher D. Fink, Archbold, OH.

Signed and Sealed this Twelfth Day of June, 2001.

HARRY C. KIM
*Primary Examiner*
Art Unit 3629